Feb. 18, 1969   A. DEL PESCO   3,428,286
ADJUSTABLE ARTICLE HOLDER
Filed Jan. 3, 1967
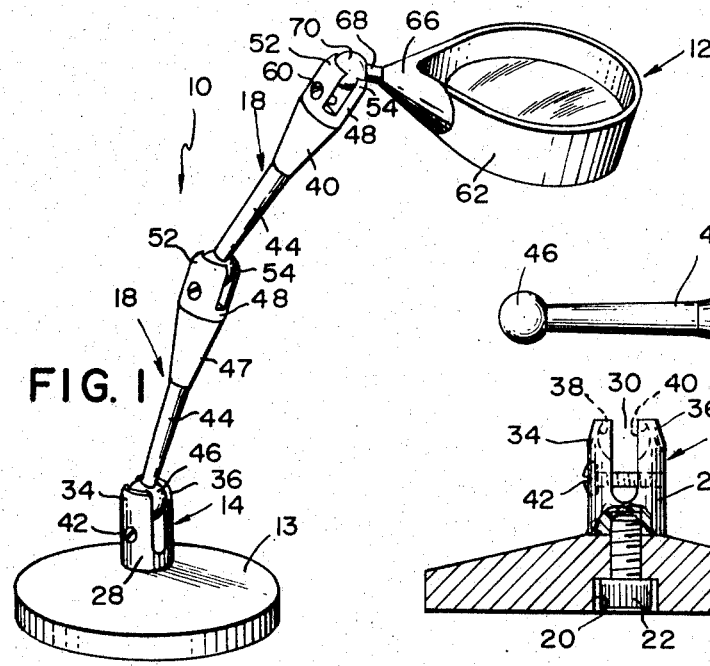
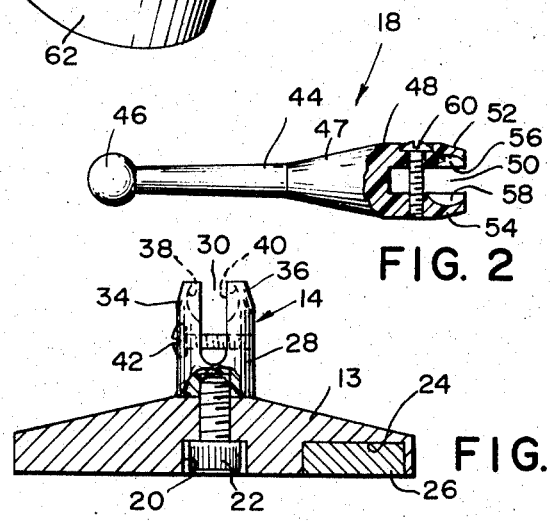
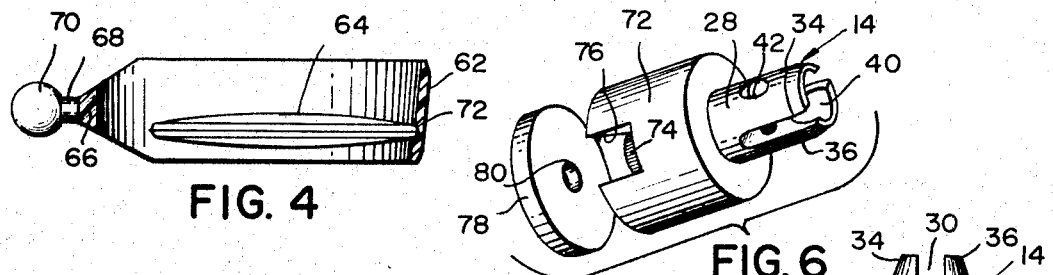
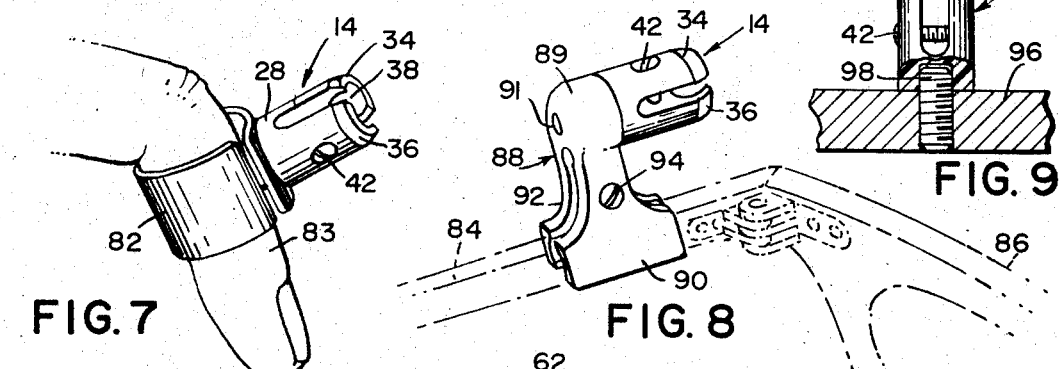
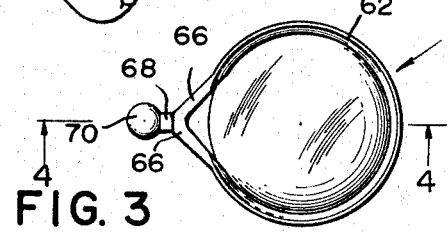
INVENTOR.
ANDREW DEL PESCO
BY
*Salter & Michaelson*
ATTORNEYS United States Patent Office 3,428,286
Patented Feb. 18, 1969

3,428,286
ADJUSTABLE ARTICLE HOLDER
Andrew Del Pesco, Danielson, Conn. 06239
Filed Jan. 3, 1967, Ser. No. 606,892
U.S. Cl. 248—474                               1 Claim
Int. Cl. A47g 1/24; A47f 5/04, 7/14

ABSTRACT OF THE DISCLOSURE

An article holder that includes a socket member interconnected to a base, the socket member receiving a ball member that provides for universal adjustment of the article for locating the article in various positions of use.

Background of the invention

Although the holder of the present invention has a variety of applications, a preferred form of use is in connection with a magnifying glass. Holders for magnifying glasses have been employed heretofore but have generally consisted of a stand that was either fixed at one or both ends and thus had little flexibility in movement of the magnifying glass in accordance with the requirements of use. The prior known holders were also usually constructed so as to permanently retain the magnifying glass thereon and did not provide for release of the magnifying glass if the mounting thereof on another type of holder construction was desired.

Summary of the invention

The holder of the present invention includes a socket member that is joined to a suitable base and that is formed with a slot therein. The slot of the socket member receives a ball member for universal adjustment therein, the ball member being interconnected to a frame or ring in which an article such as a magnifying glass is mounted. In one form of the invention, an elongated leg member is interconnected to the socket member and is formed with a ball thereon that is received within the socket member, the leg member being further formed with a socket on an end thereof in which a ball member that is connected to the magnifying glass is received. By incorporating the basic socket member for use with a base and employing a magnifying glass assembly on which a ball member is located, a variety of uses of the present invention are contemplated and are described hereinafter.

Accordingly, it is an object of the invention to provide an article holder that enables the article to be universally adjusted to various positions of use.

Another object of the invention is to provide a holder having a socket member formed as a part thereof for receiving a ball that is interconnected to a frame, the ball and socket defining a joint that provides for universal adjustment of the frame.

Still another object is to provide a magnifying glass holder in which at least one leg member formed with a ball on one end and a socket on the other end is interconnected to a magnifying glass assembly, wherein the magnifying glass assembly is mounted on a base for universal adjustment with respect thereto.

Other objects, features and advantages of the invention will become apparent as the description thereof proceeds when considered in connection with the accompanying illustrative drawings.

Description of the drawing

FIG. 1 is a perspective view showing one form of a holder embodied in the present invention and as adapted for use with a magnifying glass assembly;

FIG. 2 is an elevational view with parts shown in section of a leg member of the holder embodied herein;

FIG. 3 is a top plan view of the magnifying glass assembly shown in FIG. 1;

FIG. 4 is a sectional view taken along lines 4—4 in FIG. 3;

FIG. 5 is a sectional view of the base illustrated in FIG. 1 showing a socket member mounted thereon;

FIG. 6 is an exploded perspective view showing a modified form of a base on which a socket member is mounted;

FIG. 7 is a perspective view showing a further modified form of a base on which a socket member is mounted;

FIG. 8 is a perspective view showing a further modified form of a base as used on an eyeglass temple and on which a socket member is mounted; and FIG. 9 is an elevational view with parts shown in section of a socket member that is mounted directly on a fixed base.

Description of the invention

Referring now to the drawing and particularly to FIG. 1, one form of the article holder embodied in the present invention is generally indicated at 10 and as shown is adapted to be used in connection with a magnifying glass assembly generally indicated at 12. The holder 10 includes a base 13 on which a socket member generally indicated at 14 is mounted, the magnifying glass assembly 12 being interconnected to the socket member 14 through leg members generally indicated at 18. As will be described hereinafter, various forms of bases may be incorporated with the socket member 14 and the magnifying glass assembly 12, the base 13 as shown in FIG. 1 having a circular configuration and the underside thereof having a groove 20 formed therein for receiving a headed screw 22. The screw 22 projects through the base 13 into a threaded opening formed in the body of the socket member 14 for securing the socket member 14 to the base 13. Also formed on the underside of the base 13 are a plurality of recesses 24 in which magnet elements 26 are fixed, the magnet elements 26 providing for mounting of the base 12 on a metallic surface. The magnet elements 26 further increase the weight of the base 13 so as to provide stability thereto when the magnifying glass assembly 12 and leg members 18 are interconnected to the socket member 14.

As shown in FIG. 5, the socket member 14 includes a body portion 28 that is preferably molded of a plastic material and in which a slot 30 is formed, the slot 30 extending in a longitudinal direction with respect to the axis of the body portion 28 for a substantial portion of the length thereof. The slot 30 defines opposed lips 34 and 36, on the inside surfaces of which are formed concave depressions 38 and 40, respectively. As will be described, the concave depressions 38 and 40 are adapted to receive a ball member therein and, accordingly, have a radius of curvature corresponding generally to that of the ball member for accommodating the ball member in interfitting engagement therebetween. In order to adjust the position of the lips 34 and 36 with respect to each other, an adjustment screw 42 extends therethrough near the base of the slot 30 and, as will be described, provides for a tight or loose engagement of a ball member within the socket member 14.

In the form of the invention illustrated in FIG. 1, the lowermost of the leg members 18 engages the socket member 14 and, as shown in FIG. 2, the leg member 18 includes an elongated shank 44 on one end of which a ball member 46 is joined. The other end of the elongated shank 44 tapers outwardly at 47 to an enlarged head portion 48, the enlarged head portion having a slot 50 formed therein that defines opposed lips 52 and 54. This construction also defines a socket such as that formed in the socket member 14 and as seen in FIG. 2, the lips 52 and 54 have concave depressions 56 and 58 formed therein, respectively. An adjustment screw 60 extends through the lips 52 and 54 for adjusting the relative position thereof when a ball member is received in the socket that is defined by the depressions 56 and 58. It is understood that both of the leg members 18 as illustrated in FIG. 1 are preferably molded of a plastic material and have substantially an identical construction.

The lowermost of the leg members 18 that interfits with the socket member 14 is releasably engaged therewith, the formation of the socket as defined by the concave depressions 38 and 40 in the lips 34 and 36 receiving the ball member 46 in seating relation therein. In this connection, the curvature of the depressions 38 and 40 is similar to that of the ball member 46, the depressions 38 and 40 being adapted to seat the ball member 46 therein for positively interconnecting the leg member 18 to the socket member 14 for universal adjustment with respect thereto. It is understood that the adjustment screw 42 may be adjusted for adjusting the frictional engagement of the lips 34 and 36 with respect to the ball member 46. Since the lips 34 and 36 are somewhat resilient because of the formation thereof of a plastic material, the ball member 46 may be forced between the lips 34 and 36 and snapped into place in the depressions 38 and 40 when the lower leg member 18 is interconnected to the socket member 14. With the ball member 46 located in the socket defined by the depressions 38 and 40 as illustrated in FIG. 1, it is seen that the leg member 18 has universal adjustment with respect to the socket member 14. It is further seen that the shank 44 that is joined to the ball member 46 has a diameter that is somewhat less than the lateral dimension of the slot 30. The leg member 18 is thus movable within the slot 18 through an arc greater than 180°. This means that the leg member 18 that is interconnected to the socket member 14 may be moved to a variety of positions so as to place the magnifying glass assembly 12 in close proximity to any desired location.

Although it may be desirable to interconnect the magnifying glass assembly 12 directly to the lowermost of the leg members 18, a second leg member 18 is preferably interposed between the lowermost leg member 18 and the magnifying glass assembly 12. Thus, greater flexibility of movement of the magnifying glass assembly 12 is achieved.

Referring now to FIGS. 3 and 4, the magnifying glass assembly 12 is more clearly illustrated and as shown includes a ring or frame 62 that is molded of a plastic material in a one-piece construction. The frame 62 is generally circular but is tapered inwardly from top to bottom as shown in FIG. 4, the purpose of which is to positively retain a lens 64 therein. The frame 62 includes a V-type connection defined by arms 66, to which a shortened shank 68 is joined. Joined to the outer end of the shank 68 is a ball member 70 that is substantially similar to the ball member 46 previously described. Formed on the inner surface of the frame 62 is a groove 72 in which the lens 64 is adapted to be received when forced inwardly of the frame 62 from the topmost end thereof as viewed in FIG. 4. Since the material from which the frame 62 is constructed is plastic and because of the formation of the arms 66, the frame has a certain amount of flexibility. Thus, the lens 64 is conveniently mounted in the frame 62 by inserting it at the top end thereof, as seen in FIG. 4, and pressing downwardly until the peripheral edge of the lens 64 snaps into the groove 72.

With the lens 64 assembled in position within the frame 62 as illustrated in FIGS. 3 and 4, the magnifying glass assembly 12 is then interconnected to the socket member 14 by the inserting of the ball member 70 within the socket of the uppermost of the leg members 18. Since the ball member 70 has a curvature that is generally similar to the curvature of the depressions 56 and 58 formed in the lips 52, 54 of the uppermost of the leg members 18, the ball member 70 is received within the uppermost socket in snap fitting relation so as to provide for universal movement of the magnifying glass assembly 12 with respect to the uppermost leg member 18. It is also seen that the shank 68 has a lateral dimension or diameter that is somewhat less than the lateral dimension of the slot 50 of the uppermost of the leg members 18. The magnifying glass assembly 12 may thus be moved through an arc of more than 180° as the shank 68 is received within the slot 50 of the uppermost leg 18. This movement coupled with the universal movement of the leg members with respect to the sockets in which they are received enables the magnifying glass assembly 12 to be adjusted to a variety of positions.

Referring now to FIG. 6, a modified form of the invention is illustrated with respect to the base on which the socket member 14 is attached. As shown in FIG. 6, the socket member 14 is secured to a permanent magnet 72 by a bolt 74 that extends through a slot 76 formed on the underside of the magnet 72 and into the body portion 28 of the socket member 14. The magnet 72 may be suitably mounted on any suitable metallic structure, and the leg members 18 and magnifying glass assembly 12 may be interconnected to the socket member 14 in the manner as indicated above.

If desired, a mounting disc 78 may be employed for securing the magnet 72 in place. In this connection, a central opening 80 is formed in the mounting disc 78 for receiving a screw therein, the mounting disc 78 being normally fixed to a nonmetallic surface by the screw so as to receive the magnet 72 thereon. Thus the mounting disc 78 provides for convenient mounting of the magnet 72 in a variety of locations and environments.

On occasion it is desirable to locate the magnifying glass assembly 12 on the user's finger so as to provide for convenient use thereof. In order to locate the magnifying glass assembly 12 in this manner, the socket member 14 is secured to a resilient loop 82 through which a finger 83 of the user may extend as indicated in FIG. 7. In use of the socket member 14 in this arrangement, the loop 82 defines a base for the socket member 14.

The magnifying glass assembly 12 has particular use as a watchmaker's tool and for this purpose may be mounted on a temple 84 of an eyeglass frame 86 as indicated in FIG. 8. A base generally indicated at 88 includes a body portion 89 to which the socket member 14 is secured by a screw 91. Opposed jaws are joined to the body portion 89 and are adjustable by means of a screw 94 that extends laterally therethrough. As shown in FIG. 8, the temple 84 is received between the opposed jaws 90 and 92 of the base 88 for mounting the socket member 14 on the temple 84 and one or more of the leg members 18 may be interconnected to the socket member 14 for locating the magnifying glass assembly 12 forwardly of the frame 86. With the magnifying glass assembly 12 positioned forwardly of the frame 86, the user thereof may adjust the position of the frame 62 in any desired manner for use in working on articles such as watch parts that require magnification.

It is also contemplated to mount the socket member 14 on a permanent surface as distinguished from the portable base 12 and the other bases as described hereinabove. In this connection, the socket member 14 may be secured to a base 96 as shown in FIG. 9 which may be formed as part of a bracket, table top, or other fixed installation that cannot be readily moved. In order to mount the socket member 14 in the base 96 a mounting screw 98 is provided and extends through an opening formed in the base 96 and is received in the body 28 of the socket member 14 in threaded engagement therewith.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claim.

What is claimed is:

1. In an article holder, a base, a socket member joined to said base and having a slot formed therein that defines opposed lips, said lips forming a socket therebetween, a ball member being received in said socket between said lips in releasable engagement therewith, the opposed lips having resilient characteristics that provide for positively retaining said ball member therebetween but that enable said ball member to be snapped outwardly therefrom when an outwardly directed force is applied to said ball member, an article assembly being interconnected to said ball member and said ball member being universally movable in said socket so as to provide for universal adjustment of said article assembly, a leg member interconnecting said article assembly to said socket member, said leg member including an elongated shank to one end of which said ball member is joined and in the other end of which a socket is formed, the socket of said leg member receiving a ball member that is interconnected to said article assembly, said article assembly including a frame that is molded in a one-piece unit of a flexible plastic material and having an annular wall that is tapered with respect to the diameter thereof, an annular groove formed interiorly of said frame and being located in said annular wall so as to receive a lens in snap fitting relation, the flexible plastic material of said frame providing for limited movement thereof to accommodate said lens in said annular groove, the ball member to which said article assembly is interconnected being formed as an integral part of said frame.

References Cited

UNITED STATES PATENTS

| | | | |
|---|---|---|---|
| 1,290,252 | 1/1919 | Lester | 248—481 |
| 1,324,456 | 12/1919 | Lutz | 248—481 |
| 2,474,942 | 7/1949 | Hawkins | 248—206 |
| 2,526,045 | 10/1950 | Riemann | 287—21 |
| 2,702,683 | 2/1955 | Green | 248—206 X |
| 2,752,726 | 7/1956 | Calverley | 287—89 X |
| 2,995,983 | 7/1961 | Davis | 248—206 X |

CHANCELLOR E. HARRIS, *Primary Examiner.*

U.S. Cl. X.R.

248—278, 481